UNITED STATES PATENT OFFICE.

MURDOCH MACKAY, OF LONDON, ENGLAND, ASSIGNOR OF ONE-HALF TO RICHARD EDWARD GOOLDEN, OF SAME PLACE.

MANUFACTURE OF INSULATING COMPOUNDS.

SPECIFICATION forming part of Letters Patent No. 268,034, dated November 28, 1882.

Application filed August 15, 1882. (No specimens.)

*To all whom it may concern:*

Be it known that I, MURDOCH MACKAY, a subject of the Queen of Great Britain, residing at London, England, have invented certain new and useful Improvements in the Manufacture of Insulating Compounds, applicable also to other purposes; and I do hereby declare that the following is a full, clear, and exact description of the invention, which will enable others skilled in the art to which it appertains to make and use the same.

This invention relates to the manufacture of improved compounds or compositions for electric insulation, also applicable for forming molds for electro-deposition, for electroplating, and for copying wood-cuts in copper by the electro process, also for copying set-up type, engravings, and the like.

In manufacturing the improved composition I combine, by heat, at a temperature of from about 100° Fahrenheit to about 212° Fahrenheit, in a suitable vessel, mineral wax—such as paraffine-wax or ozocerite-wax—vegetable tar, (commonly known as "wood-tar,") shellac, and asbestus or other suitable dry fibrous substance—in or about in the following proportions, videlicet: about one part, by weight, of wax; twenty-four parts of wood-tar, and thirty-two parts each of shellac and asbestus or other suitable dry fibrous substance, such as wood, flax, cotton, or paper in a dry powdered state. The above proportions are those which I have found to answer well for a soft compound, suitable for such uses as those for which gutta-percha and ebonite have generally been employed. Where a harder compound is required the proportion of wood-tar is diminished. For an extra hard compound the wax may be omitted and about twenty-four parts of ground slate or silica or clay free from iron may be added and the proportion of asbestus diminished.

In manufacturing the compounds I combine the above-named ingredients together by heat and continued stirring until they form a thick paste, and the compound can then be pressed into molds of the required shape; or the hereinbefore-described compounds, when in a hot pasty condition, may be spread out on a plate of iron, stone, or other suitable material, by rollers or otherwise, to the requisite thickness and width.

When cool the compounds can be cut, sawed, turned in a lathe, or attached by heat to any other material and pressed thereon, if required, for taking impressions and the like.

If required in a very dense condition, the compounds should be subjected to considerable pressure in the molds.

The compounds are not affected by water, or by the atmosphere, or by diluted sulphuric acid up to one part of sulphuric acid to six parts of water, will not soften at 130° Fahrenheit, and are not sticky to the touch, and cuttings and waste pieces can be remelted for reuse.

Having thus described my invention and the manner of performing the same, what I claim is—

The improved insulating compounds described, consisting of a mixture of mineral wax—such as paraffine-wax or ozocerite-wax—vegetable tar, (commonly known as "wood-tar,") shellac, and asbestus or other suitable dry fibrous substance—such as wood, flax, cotton, or paper in a dry powdered state—in substantially the proportions named, ground slate or silica or clay free from iron being sometimes employed in place of wax, substantially as and for the purposes described.

MURDOCH MACKAY.

Witnesses:
G. F. REDFERN,
A. ALBUTT.